Figure 2:
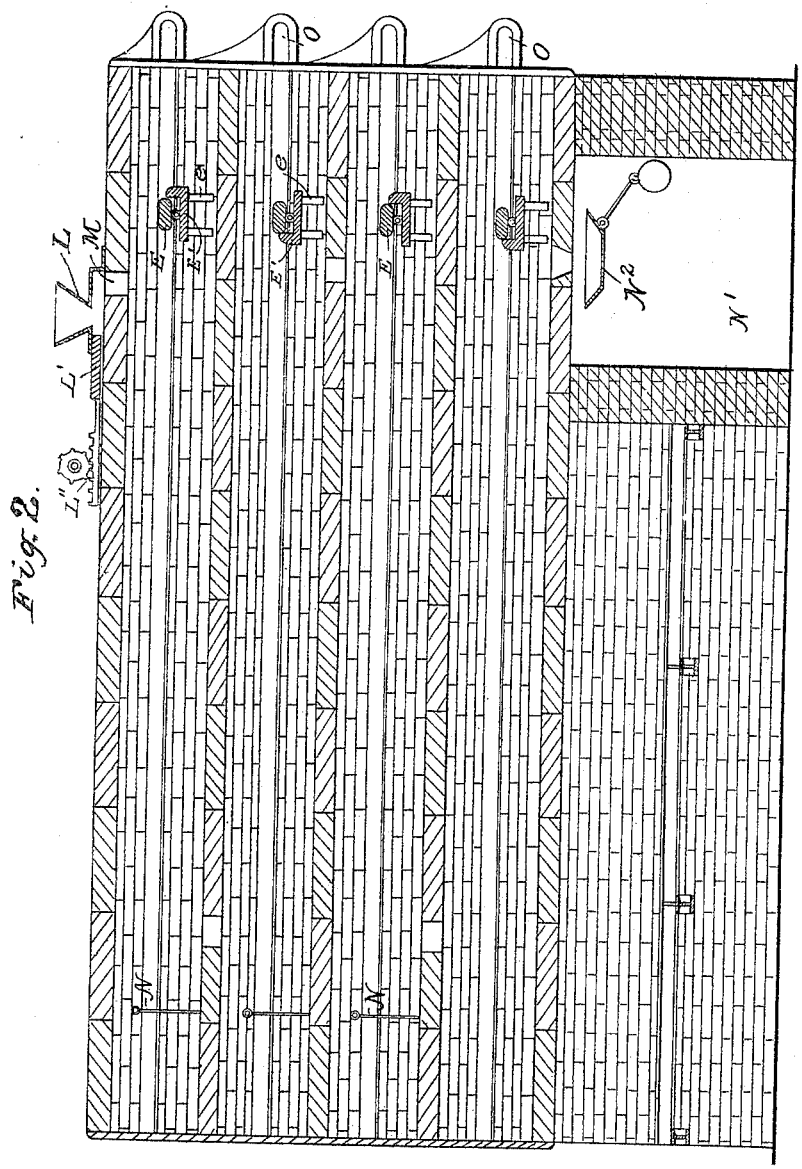

No. 642,334. Patented Jan. 30, 1900.
A. C. JOHNSON.
ORE ROASTING AND DESULFURIZING FURNACE.
(Application filed Apr. 29, 1898.)
(No Model.) 3 Sheets—Sheet I.
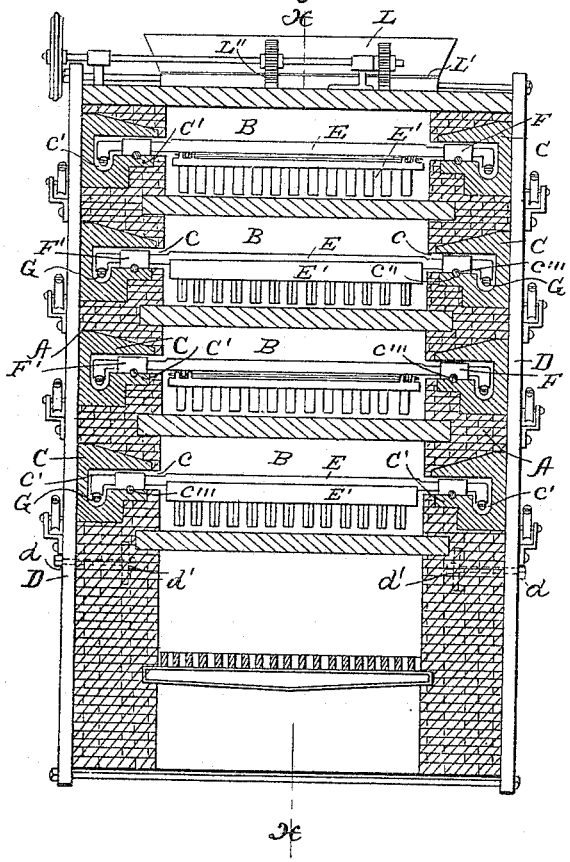
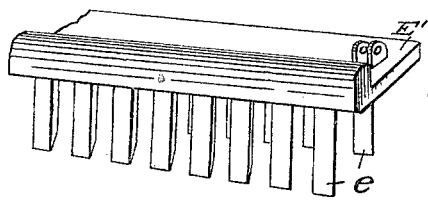
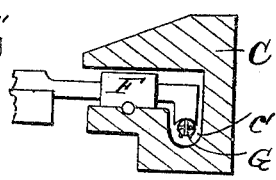
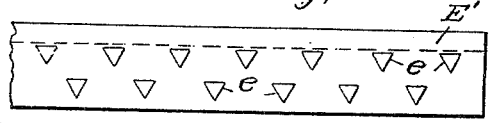
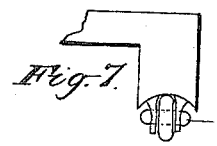
Witnesses
W. R. Edelin
John D. Hyer
Inventor
Albert C. Johnson
by [signature] atty.
THE NORRIS PETERS CO., PHOTO-LITHO., WASHINGTON, D. C.

No. 642,334. Patented Jan. 30, 1900.
A. C. JOHNSON.
ORE ROASTING AND DESULFURIZING FURNACE.
(Application filed Apr. 29, 1898.)
(No Model.) 3 Sheets—Sheet 2.

Witnesses.
H. R. Edelin.
John D. Hyer.

Inventor
Albert C. Johnson
By W. J. Johnston

No. 642,334. Patented Jan. 30, 1900.
A. C. JOHNSON.
ORE ROASTING AND DESULFURIZING FURNACE.
(Application filed Apr. 29, 1898.)
(No Model.) 3 Sheets—Sheet 3.
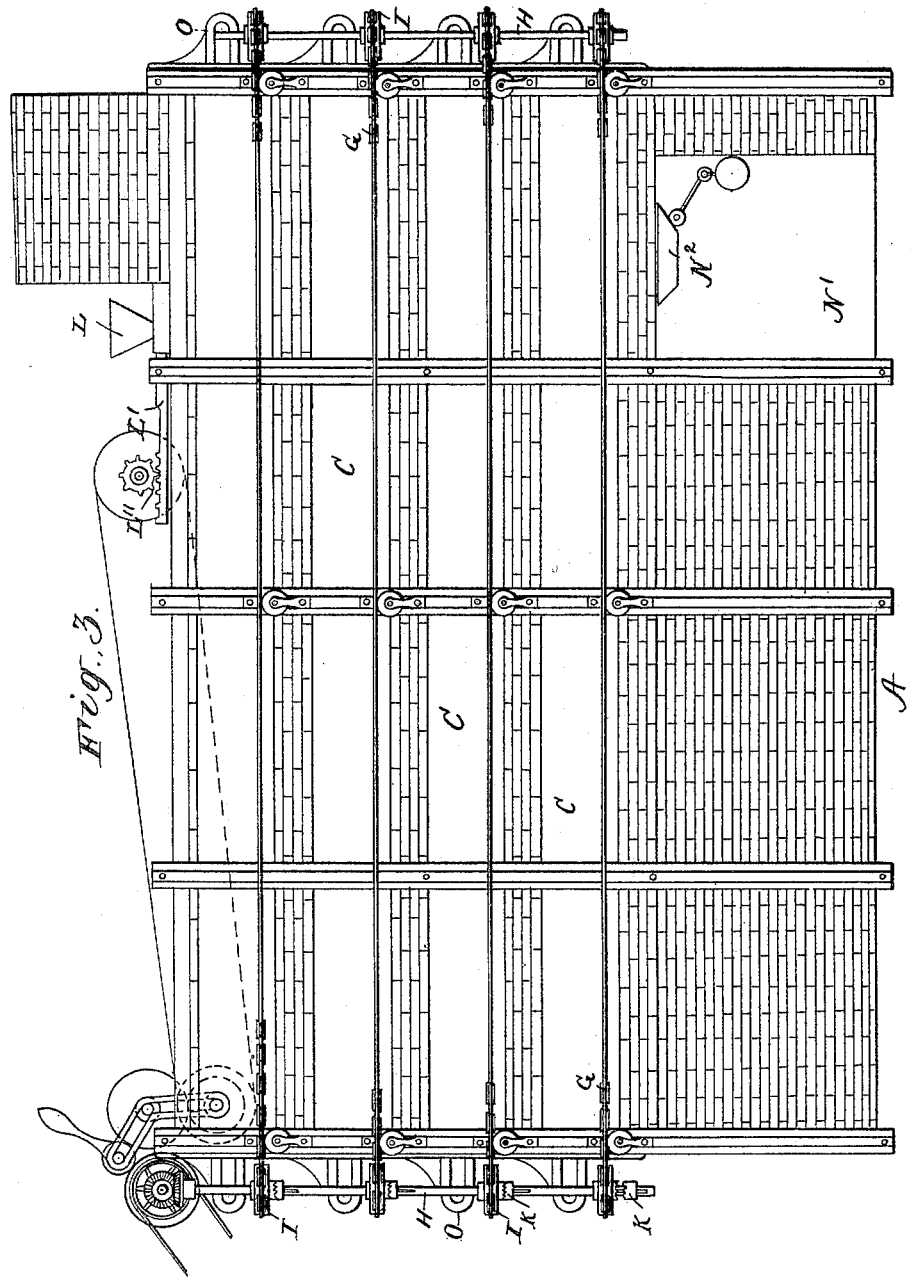

UNITED STATES PATENT OFFICE.

ALBERT COLLOM JOHNSON, OF BALTIMORE, MARYLAND.

ORE ROASTING AND DESULFURIZING FURNACE.

SPECIFICATION forming part of Letters Patent No. 642,334, dated January 30, 1900.

Application filed April 29, 1898. Serial No. 679,168. (No model.)

*To all whom it may concern:*

Be it known that I, ALBERT COLLOM JOHNSON, a citizen of the United States, residing at Baltimore, in the State of Maryland, have invented certain new and useful Improvements in Ore Roasting and Desulfurizing Furnaces; and I do hereby declare the following to be a full, clear, and exact description of the invention, such as will enable others skilled in the art to which it appertains to make and use the same.

My invention relates to a furnace, which will be hereinafter fully explained.

The objects of the invention are to provide a very neat and compact furnace for roasting or desulfurizing ores and to so construct the rake and the mechanism for operating the same that the heat of the furnace will have the least possible injurious effect on it, and thus add to the life thereof and facilitate its repair or renewal and of its operating mechanism when worn out in service.

Another object of the invention is to provide means for feeding the ore or material from the hopper to the furnace in suitable quantities.

The invention will now be fully described in connection with the accompanying drawings, forming part of this specification, and on which like letters of reference indicate corresponding parts in the different views.

Figure 1 is a vertical transverse section near the front of the furnace. Fig. 2 is a longitudinal section on the line $x\ x$, Fig. 1. Fig. 3 is a side elevation of the furnace; and Figs. 4 and 5 are details of the rake, showing the shape and arrangement of the teeth. Fig. 6 is an enlarged detail view showing the longitudinal beam in cross-section with the angular end of the rake-head and its relation to the longitudinal openings therein, also the rail or slide over which the rake-head moves. Fig. 7 is a detail of the angular end of the rake-head, showing the fork between which the chain or cable actuating the rake is secured by a pin through the fork and one of the links of the chain.

A A are the side walls of the furnace. They are constructed, chiefly, of brick of suitable thickness.

In the drawings I have shown a multiple furnace having four beds or hearths B B B B, which are constructed of any suitable material and are supported at their ends by side walls. The furnace may comprise any desired number of beds or hearths, one or more; but for ordinary uses I have found four to be sufficient, forming, of course, four ovens.

Intermediate each pair of beds or hearths I arrange at each side longitudinal beams C C of peculiar construction. These beams C are walled into the brickwork of the side walls A A and extend the entire length of the furnace on each side thereof. The beams C have, preferably, angular or inwardly-inclined top surfaces and straight or perpendicular exterior surfaces on their outer sides. Through a portion of the brickwork from the inside of the furnace and also part way through the longitudinal beams are slots $c\ c$ for a purpose which will be presently explained. Intersecting the horizontal slots $c$ just described in the beams C are vertical slots or pockets $c'\ c'$ for the ends of the angular rake-heads. The slots $c$ and $c'$ extend the entire length of the furnace. On the top of a shelf-like portion $C'$ of the beams C are formed grooves $c''$, in which grooves are inserted metal rods $c'''$, which form bearings for the rake-head shoes, to be hereinafter explained. Plain flat surfaces may be used on the shelf-like portion of the beams instead of the round rods.

Vertical posts or buckstays D D are arranged at suitable intervals on the outside of the walls at the sides and also at the front and rear end of the furnace, the posts or columns D D in front and rear being arranged to form slots on the outside of the furnace in continuation of the grooves or slots in the longitudinal beams C. The posts or buckstays D are keyed to the brickwork by suitable bolts and plates $d\ d'$, respectively.

E E are the rake-heads, and E' E' are the rakes. The rake-heads extend across the beds or hearths through the slots $c\ c$, and their ends are bent at right angles and extend into the vertical slots or pockets $c'\ c'$.

At points near the center of slots $c\ c$ shoes F F' are clamped to the rake-heads. These shoes or clamps have cut-out or reduced portions which form bearings for the metal rods $c'''$ and are adapted to slide back and forth thereon. These shoes are easily removed and replaced with new ones, when necessary, even when the furnace is in operation.

E' E' are the rakes. They are hinged to or swing on the rake-heads by means of a rod and lugs or in any other well-known way. The rakes have two rows of triangular teeth e e, as shown in Fig. 4, and they are staggered, as shown. The teeth have square heads with cylindrical shanks above their triangular-shaped body portions, so that when fitted into openings between ribs on the rakes the teeth will be prevented from turning or changing their positions. The flat sides of the teeth are always arranged facing the point to which the material is to be conveyed, the sharp sides stirring and turning the ore when traveling toward the point where the charge is to be removed. By the construction and arrangement of the rake when it comes in contact with any obstruction as it moves toward the point where a new charge is to be deposited it will tilt and ride over the same and assume its normal position when the obstruction shall have been passed. When conveying the ore toward the point of delivery, the angle of the rake in contact with the rake-head (see Fig. 2) will cause the rake to maintain its proper position and remove the obstruction.

G G are endless chains or cables connected to the angular ends of the rake-heads. These chains rest in the vertical slots $c'$ $c'$ in the beam C and are carried along in the same as the rakes are reciprocated back and forth over the bed or hearth. The endless chains pass out of the front and rear of the furnace. It will be understood that there is an endless chain for each end of the rake. In other words, there are two chains and a rake for each oven or hearth.

Mounted in proper bearings in brackets at the front and rear of the furnace are vertical shafts H H', respectively. These shafts have as many sprocket-wheels I, each having a clutch K, as there are chains. Power is applied to drive the shafts, preferably the ones in front, either at the top or bottom of the same. I have shown a band-wheel and band-gear for this purpose; but any suitable gearing will answer. The chains or cables G pass through the front of the furnace by means of thimbles and are supported on the outsides of the walls by idlers arranged at suitable intervals on the buckstays or posts.

L represents the hopper, into and through which the material is fed to the furnace. It has a slide or feed plate L' and a rack and pinion L" for reciprocating said plate. The reciprocating mechanism is connected by chain and sprocket to the main power mechanism. The stroke of the plate and, as a matter of course, the charge delivered from the hopper are regulated by means of interchangeable gears.

The material or ore drops into the furnace through the opening M, and in a multiple furnace, as shown, where several beds or hearths are used, the openings M alternate—that is to say, the opening in the top oven is at the rear, the next below at the front, and so on.

In the front end of the furnace and also at the rear, if desired, are swinging shutters N N, and they are so arranged that when the rakes have made a stroke to the back of the furnace and return the rake-head coming in contact with the shutter N causes it to swing until the rake-head has passed under it, when it will drop back to its normal position, thus protecting the rake-head and rake from the heat of the furnace when not in use, and thus adding to the life thereof, as the teeth of the rake are only in the ore or material when making a stroke, which only occurs every six or eight minutes.

The furnace has the customary fire-box and grate-bars for supplying heat to the same and the usual flue or chimney for the escape of the smoke and gases. I also prefer to use a discharge-valve for securing and discharging the waste ore as it drops through the opening in the lower bed or hearth, as at N, which consists of a weighted and fulcrumed receptacle $N^2$, which normally closes the discharge-port until filled with ore, when it discharges its load and is then caused by its weighted end to resume its normal position.

The columns or buckstays at front and rear of the furnace are provided with loops or slots O, which are practically a continuation of the lateral slots in the longitudinal beams and are for a purpose which will be presently explained.

The operation of the furnace is as follows, viz: Any suitable source of power is employed to feed the material and reciprocate the rakes. I prefer to use a double-cylinder engine with proper time-gear, as is customary. On starting the engine, which is connected to the driving-pinion on the shafts on the furnace, the rake or rakes are caused to move to the back of the furnace, when by means of well-known trips and levers on the chains connected to the rakes the engine is reversed, causing the rake or rakes to travel back to their first position. The rack and pinion, being connected also with the prime motor, move the slide, and a requisite amount of ore or material is discharged through the opening in the top hearth or bed at a time when the rake is adjacent to that point. In reversing the flat surface of the teeth come into contact with the ore and convey it toward the next opening, and this operation is repeated until it is discharged through the valve N into suitable receptacles provided therefor.

It will be seen that as the chain or cable is attached to the rake-head at the bottom of the slot or pocket $c'$ it is protected from the heat of the furnace, the part in the slot or pocket coming outside to cool off, while the cool part enters at the next stroke. The bottom of the slot or pocket is partially filled with black-lead or plumbago to reduce friction and act as a lubricator.

The vertical shafts carrying the sprockets are arranged with clutches, so that in case of needed repair of a rake the latter may run out of the furnace in the loop or slot O and be supported thereby until the needed repairs shall have been made.

Minor changes in the details of the structure may be made within the scope of the invention without departing from the spirit or sacrificing any of the advantages thereof.

Having thus fully described the invention, what I claim as new is—

1. In an ore roasting or desulfurizing furnace, longitudinal side beams having intersecting longitudinally-extending lateral and vertical slots, in combination with a reciprocating rake, the latter comprising a head with right-angled ends, and a rake pivoted to said head, endless chains or cables connected with the angular ends of the rake-heads and supported in the slots or pockets and on exterior idlers, and means for reciprocating the chains or cables, substantially as described.

2. In an ore roasting or desulfurizing furnace, longitudinal side beams having intersecting longitudinally-extending lateral and vertical slots, in combination with a reciprocating rake, the latter comprising a head with right-angled ends and with triangular-shaped teeth in cross-section, and pivoted to the head, endless chains or cables connected with the angular ends of the rake-head and supported in the slot or pocket and on exterior idlers, and means for reciprocating the chains or cables, substantially as described.

3. In an ore roasting or desulfurizing furnace, longitudinal side beams having intersecting longitudinally-extending lateral and vertical slots, in combination with a reciprocating rake, the latter comprising a head with right-angled ends, and with teeth which are triangular in cross-section and arranged in staggered form, said rake pivoted to the head, endless chains or cables connected with the angular ends of the rake-head and supported in the slot or pocket and on idlers exterior of the heating-chambers, and means for reciprocating the chain or cable, substantially as and for the purpose described.

4. In an ore roasting and desulfurizing furnace, longitudinal side beams with slots or pockets formed in the body thereof and extending their entire length, and also provided with tracks or ways for the rake-head, in combination with a pivoted rake, having its head formed with angular ends, and with shoes to travel on the tracks or ways, endless chains or cables connected with the rake-head and concealed in the slot or pockets, and means for reciprocating the chain or cable, substantially as and for the purpose set forth.

5. In an ore roasting and desulfurizing furnace, longitudinal side beams with slots or pockets containing endless chains or cables, said chains or cables adapted to be reciprocated in said pockets and extending to and supported on the outside of the furnace, posts or buckstays ranged along the exterior sides of the furnace, idlers on the posts or buckstays, reciprocating rakes connected to the chains or cables, and the buckstays or posts at one end of the frame provided with slots or loops formed as a continuation of the slots or pockets in the beams, and means for reciprocating the chains, substantially as described.

In testimony whereof I affix my signature in presence of two witnesses.

ALBERT COLLOM JOHNSON.

Witnesses:
WM. MERRIKEN,
WM. C. ALLWELL.